US012640426B1

(12) United States Patent
Xu et al.

(10) Patent No.: US 12,640,426 B1
(45) Date of Patent: May 26, 2026

(54) APPARATUS, SYSTEM, AND METHOD FOR EMBEDDING AND PROTECTING FLEXIBLE BATTERIES IN WEARABLES

(71) Applicant: Meta Platforms Technologies, LLC, Menlo Park, CA (US)

(72) Inventors: Tianren Xu, San Jose, CA (US); Karthik Kadirvel, Cupertino, CA (US); Hyung Gu Yun, Newcastle, WA (US); Jason Howard, Alpharetta, GA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 623 days.

(21) Appl. No.: 18/166,995

(22) Filed: Feb. 9, 2023

Related U.S. Application Data

(60) Provisional application No. 63/356,102, filed on Jun. 28, 2022, provisional application No. 63/353,379, filed on Jun. 17, 2022.

(51) Int. Cl.
| | |
|---|---|
| *H01M 50/238* | (2021.01) |
| *H01M 50/105* | (2021.01) |
| *H01M 50/136* | (2021.01) |
| *H01M 50/202* | (2021.01) |
| *H01M 50/247* | (2021.01) |

(Continued)

(52) U.S. Cl.
CPC ....... *H01M 50/238* (2021.01); *H01M 50/105* (2021.01); *H01M 50/136* (2021.01); *H01M 50/202* (2021.01); *H01M 50/247* (2021.01); *H01M 50/271* (2021.01); *H01M 50/531* (2021.01); *H01M 2220/30* (2013.01)

(58) Field of Classification Search
CPC ............. H01M 50/238; H01M 50/247; H01M 50/202; H01M 50/531; H01M 50/136; H01M 50/105; H01M 50/271; H01M 2220/30
See application file for complete search history.

(56) References Cited

U.S. PATENT DOCUMENTS

| | | | |
|---|---|---|---|
| 5,637,418 A | 6/1997 | Brown et al. | |
| 6,528,204 B1 * | 3/2003 | Hikmet ............... | H01M 10/052 429/153 |
| 6,679,926 B1 | 1/2004 | Kajiura et al. | |

(Continued)

FOREIGN PATENT DOCUMENTS

| | | |
|---|---|---|
| CN | 203860580 U | 10/2014 |
| CN | 206628549 U | 11/2017 |

OTHER PUBLICATIONS

International Preliminary Report on Patentability for International Application No. PCT/US2023/025636, mailed Dec. 26, 2024, 8 pages.

(Continued)

*Primary Examiner* — Jane J Rhee
(74) *Attorney, Agent, or Firm* — Morgan, Lewis & Bockius LLP

(57) ABSTRACT

A wearable comprising (1) a flexible battery that includes coated electrode segments that each contain positively charged and negatively charged layers, (2) an exoskeleton coupled to the flexible battery and fitted to contour the coated electrode segments, and (3) a band that forms a cavity shaped to fit the flexible battery and the exoskeleton. Various other apparatuses, devices, systems, and methods are also disclosed.

20 Claims, 14 Drawing Sheets

(51) Int. Cl.
_H01M 50/271_ (2021.01)
_H01M 50/531_ (2021.01)

(56) References Cited

U.S. PATENT DOCUMENTS

| | | | |
|---|---|---|---|
| 9,343,716 | B2 | 5/2016 | Rothkopf et al. |
| 9,748,532 | B2 | 8/2017 | Takano et al. |
| 9,971,448 | B2 | 5/2018 | Franklin et al. |
| 10,476,046 | B2 | 11/2019 | Rho et al. |
| 10,535,845 | B1 | 1/2020 | Liu et al. |
| 10,622,591 | B2 | 4/2020 | Yang |
| 10,849,392 | B1 | 12/2020 | Wittenberg et al. |
| 11,064,604 | B1 | 7/2021 | Goldin et al. |
| 2015/0333302 | A1 | 11/2015 | Johns |
| 2020/0044222 | A1 | 2/2020 | Xiao et al. |
| 2020/0073337 | A1* | 3/2020 | Wang .................. G06F 1/1656 |
| 2021/0280896 | A1 | 9/2021 | Londarenko et al. |
| 2022/0181705 | A1 | 6/2022 | Yoshioka |
| 2022/0336896 | A1 | 10/2022 | Tse et al. |

OTHER PUBLICATIONS

International Preliminary Report on Patentability for International Application No. PCT/US2023/025638, mailed Dec. 26, 2024, 8 pages.

International Search Report and Written Opinion for International Application No. PCT/US2023/025636, mailed Sep. 27, 2023, 12 pages.

International Search Report and Written Opinion for International Application No. PCT/US2023/025638, mailed Sep. 27, 2023, 12 pages.

Hammerschmidt C., "Flexible Batteries Open up Wearable Designs," Eenewseurope.Com, Oct. 4, 2018, 4 Pages, Retrieved from the Internet URL: https://www.eenewseurope.com/en/flexible-batteries-open-up-wearable-designs/.

Jenax Inc., "[Jenax] Flexible Rechargeable Battery, J.Flex," Youtube.com, Nov. 7, 2016, 2 Pages, Retrieved from the Internet URL: https://www.youtube.com/watch?v=4EdbfGmfZkc.

Qian G., et al., "Bioinspired, Spinelike, Flexible, Rechargeable Lithiumion Batteries with High Energy Density," Advanced Materials, Jan. 31, 2018, vol. 30, 8 Pages.

\* cited by examiner

Flexible Battery
104

Segment
208(N)

Segment
208(1)

Positively Charged Layer
204

Segment
210(N)

Segment
210(1)

Negatively Charged Layer
206

Wearable
100

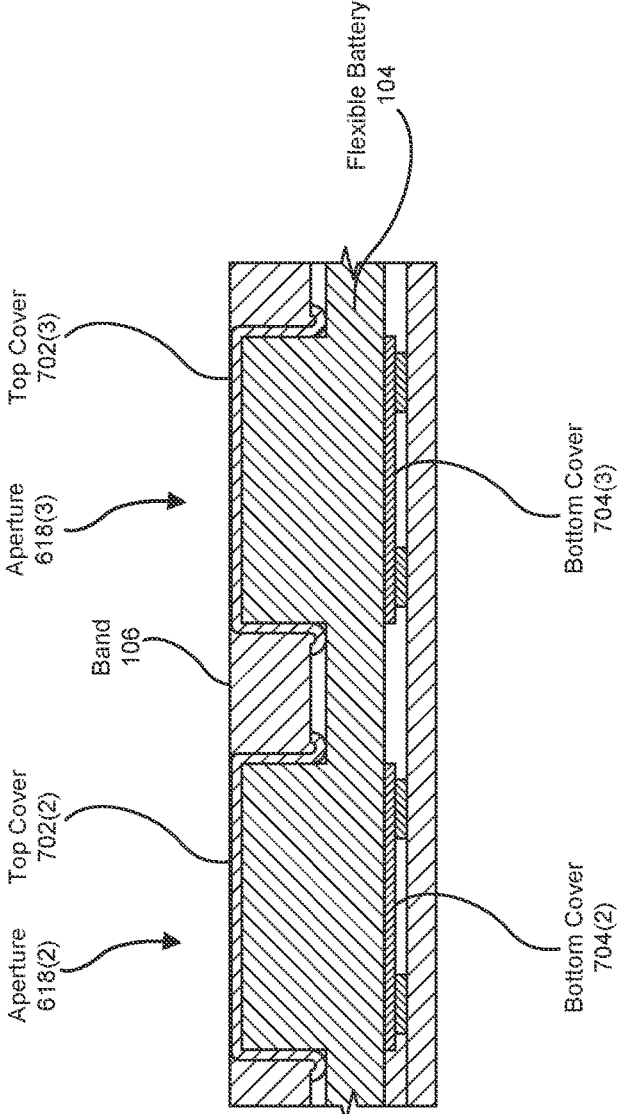
*FIG. 8*

900

1400

APPARATUS, SYSTEM, AND METHOD FOR EMBEDDING AND PROTECTING FLEXIBLE BATTERIES IN WEARABLES

CROSS-REFERENCE TO RELATED APPLICATIONS

This application claims the benefit of priority to U.S. Provisional Application Nos. 63/353,379 and 63/356,102, which were filed 17 Jun. 2022 and 28 Jun. 2022, respectively. The contents of these provisional applications are also incorporated herein by reference in their entirety. In addition, this application is related to U.S. application Ser. No. 17/899,286, the disclosure of which is incorporated in its entirety by this reference.

BRIEF DESCRIPTION OF DRAWINGS

The accompanying drawings illustrate a number of exemplary embodiments and are parts of the specification. Together with the following description, the drawings demonstrate and explain various principles of the instant disclosure.

FIG. 8 is an illustration of a portion of an exemplary wearable with an embedded flexible battery that is protected by an exoskeleton according to one or more embodiments of this disclosure.

Figure 1:
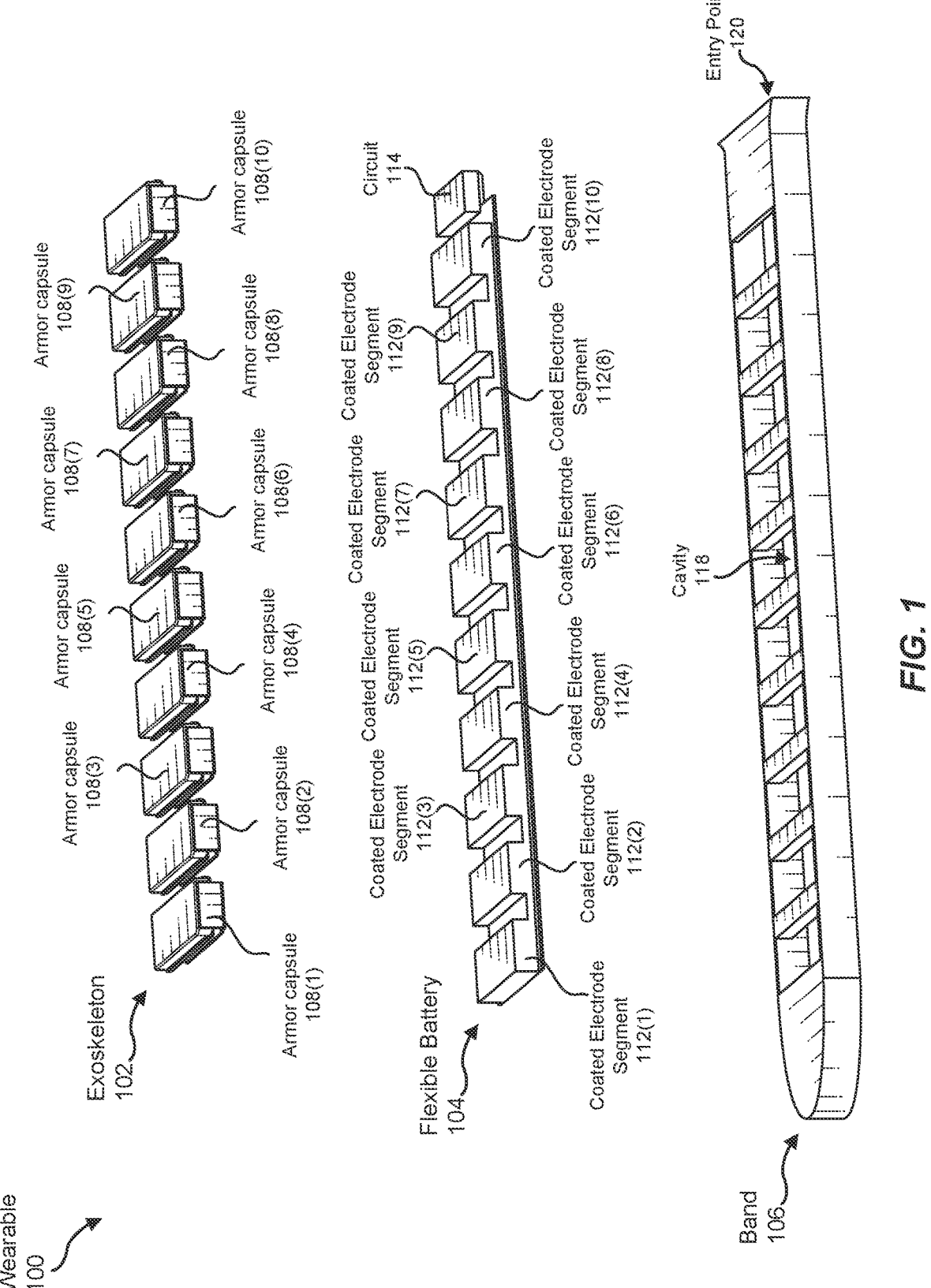
FIG. 1 is an illustration of a portion of an exemplary wearable with an embedded flexible battery that is protected by an exoskeleton according to one or more embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to apparatuses, systems, and methods for embedding and protecting flexible batteries in wearables. As will be explained in greater detail below, these apparatuses, systems, and methods may provide numerous features and benefits.

Wearable devices often include and/or incorporate batteries that serve as power sources for powering onboard electronics and/or components. Wearable designers may face and/or encounter certain design constraints that influence various features and/or characteristics (e.g., the size, shape, and/or weight) of wearable devices. For example, to extend and/or increase the battery life of wearable devices, wearable designers may select and/or implement batteries that consume and/or occupy a significant amount of space within and/or on the wearable devices. However, to increase and/or improve comfort and/or usability, wearable designers may try to minimize and/or limit the size of the wearable devices. Unfortunately, one of the features that often adds significantly to the size and/or bulk of wearable devices may be batteries.

Accordingly, wearable designers may search for and/or develop different ways of integrating and/or hiding the batteries in the wearable devices. For example, flexible and/or bendable batteries may be able to fit inside wristbands or necklaces of wearable devices. In some examples, such batteries may include and/or represent various positively charged and negatively charged layers wound and/or stacked together and separated by dielectrics. In one example, a battery may achieve flexibility and/or bendability by implementing an array of coated electrode segments that each include stacks of alternating positively charged and negatively charged layers. In this example, the coated electrode segments of the battery may be separated by air, gas, and/or a filler material.

In some examples, to induce and/or promote electrochemical reactions in the battery, the different positively charged and negatively charged layers of the battery may need to maintain good and/or electrically strong contacts with one another. In one example, the internal core of the battery may include and/or represent the various positively charged and negatively charged layers. In this example, the internal core of the battery may be inserted and/or embedded in a pouch package. This pouch package may support and/or provide pressure to the internal core at nearly vacuum levels. In certain implementations, the difference between the pressure outside the pouch package and the pressure inside the pouch package may cause the pouch package to compress and/or firmly hold the internal core of the positively charged and negatively charged layers together. This compression and/or firm hold on the internal core may promote and/or support good electrical contact across the different positively charged and negatively charged layers stacked in the coated electrode segments of the battery.

As wearables are likely to undergo significant movement, bending, and/or jostling throughout their lifetime, additional protective measures and/or features may be able to reinforce the internal core of the battery and/or potentially extend the life of the battery. In some examples, an exoskeleton may enshroud, surround, and/or cover all or certain portions of the battery to reinforce the internal core and/or to protect the internal core against coming undone and/or disconnecting one or more positively charged and negatively charged layers. By doing so, the exoskeleton may increase the durability and/or resiliency of the battery and/or extend its life.

In some examples, an exoskeleton applied to a flexible battery of a wearable may include and/or represent individual armor capsules that are fitted to cover individual electrode segments of the flexible battery. For example, the various positively charged and negatively charged layers of the battery may be chemically bonded together in a stack to form an electrode segment. A set of these electrode segments may be individually coated and/or wrapped in a pouch package to provide structure and/or support. In one example, the chemical bonding and/or the pouch package may stabilize and/or hold each coated electrode segment in place relative to its neighboring coated electrode segments. In this example, a current collector may be disposed and/or applied across each positively charged and/or negatively charged layer. The coated electrode segments may remain rigid and/or firm while the gaps between such segments facilitate, support, and/or provide flexibility to the battery as a whole. The overall flexibility of the battery may be defined and/or controlled by the sizes of the individual coated segments and/or the adjacent gaps between the coated segments.

In some examples, the individual armor capsules may be applied and/or fitted to the individual coated electrode segments. For example, each armor capsule may include and/or represent a top part or cover and a bottom part or cover. In this example, the top part or cover of each armor capsule may be attached and/or coupled to a top portion of a certain coated electrode segment of the battery, and the bottom part or cover of each armor capsule may be attached and/or coupled to a bottom portion of the certain coated electrode segment of the battery. Accordingly, the top and bottom parts or covers of each armor capsule may effectively sandwich a coated electrode segment of the battery. By doing so, the top and bottom parts or covers of each armor capsule may serve and/or function to compress and/or protect a coated electrode segment of the battery, thereby forcing the positively charged and negatively charged layers within the coated electrode segment together.

In some examples, the armor capsules may be contoured and/or shaped to fit, house, and/or cover the coated electrode segments of the battery. In one example, the armor capsules may be individually applied and/or installed onto the coated electrode segments of the battery by way of an interference fit, a tension fit, a compression fit, a press fit, and/or a slip fit. Additionally or alternatively, the armor capsules may be individually attached and/or coupled to the coated electrode segments of the battery by way of an adhesive.

In other examples, rather than being comprised of individual armor capsules, the exoskeleton applied to the flexible battery of the wearable may include and/or represent a single protective or mechanical unit that at least partially encapsulates and/or encases the coated electrode segments of the battery. Additionally or alternatively, the exoskeleton applied to the flexible battery of the wearable may include and/or represent one or more top covers and one or more bottom covers that, when installed, at least partially encapsulate and/or encase the coated electrode segments of the battery.

In some examples, the wearable may include a wristband or a necklace that is shaped to house and/or hold the exoskeleton (e.g., the armor capsules) and the flexible battery. In one example, the wristband of a smartwatch may include and/or form a malleable and/or stretchable cavity, void, space, and/or vacancy shaped to fit around and/or hold the exoskeleton (e.g., the armor capsules) and the flexible battery together and/or intact. In this example, the wristband may be shaped and/or contoured to apply pressure to and/or compress the exoskeleton and/or the coated electrode segments of the battery.

In some examples, the flexible battery may include and/or represent various positively charged layers (e.g., positive electrodes and/or cathodes) that obtain and/or acquire electrons from and/or through a circuit. In such examples, the cathode layers may be reduced during electrochemical reactions that produce electricity and/or power in connection with the battery. In other words, the positively charged layers may be electrochemically reduced as the battery discharges.

Additionally or alternatively, the flexible battery may include and/or represent various negatively charged layers (e.g., negative electrodes and/or anodes) that release electrons to and/or through the circuit. In such examples, the negatively charged layers may oxidize during the electrochemical reactions that produce electricity and/or power in connection with the battery. In other words, the negatively charged layers may be electrochemically oxidized as the battery discharges. The positively charged and/or negatively charged layers may collectively constitute and/or represent the internal core of the battery.

In some examples, the positively charged and/or negatively charged layers may include and/or incorporate current collectors that electrically couple different coated segments together. In one example, the current collector disposed on and/or applied to the cathode materials may include and/or represent aluminum foil and/or sheeting. Additionally or alternatively, the current collector disposed on and/or applied to the anode materials may include and/or represent copper foil and/or sheeting. In one example, each positively charged and/or negatively charged layer may include and/or incorporate at least one current collector.

In some examples, each positively charged layer may form part of and/or be included in a series and/or string of individual coated segments that contain cathode material. Examples of cathode materials include, without limitation, cobalt, nickel, manganese, lithium, iron, oxygen, variations or combinations of one or more of the same, and/or any other suitable cathode materials.

In some examples, each negatively charged layer may form part of and/or be included in a series and/or string of individual coated segments that contain anode material. Examples of anode materials include, without limitation, graphite, iron, carbon, steel, lithium, silicon, oxygen, variations or combinations of one or more of the same, and/or any other suitable anode materials.

In one example, the individual electrode segments formed by the positively charged and/or negatively charged layers may be covered, surrounded, and/or encased by a coating. In this example, the coated segments may be rigid and/or stiff as individual features and/or components. However, when the individual electrode segments are strung, coupled, and/or wound together in a pouch package, the resulting battery may, as a whole, achieve and/or provide a certain amount of flexibility through the gaps between the coated electrode segments. The amount of flexibility achieved by the battery may be defined, varied, and/or controlled by the size of the coated segments and/or the gaps between the coated segments.

In some examples, the positively charged and/or negatively charged layers may be alternately stacked atop one another within the electrode segments forming the internal core of the battery. In one example, the positively charged and/or negatively charged layers of the battery may be separated, isolated, and/or insulated from one another by one or more dielectrics. For example, a polymer separator may be disposed and/or applied between each of the cathode and anode layers across the coated electrode segments. In this example, the cathode and anode layers may be aligned in stacks forming columns of alternating cathode and anode materials within the internal core of the battery.

In some examples, each positively charged and negatively charged layer of the battery may include and/or represent a similar or identical number of segments and/or elements as one another. In one example, the stacking of the positively charged and/or negatively charged layers may result in and/or lead to the first segment of each positively charged layer aligning with the first segment of each negatively charged layer. In this example, the stacking of the positively charged and/or negatively charged layers may also result in and/or lead to the second segment of each positively charged layer aligning with the second segment of each negatively charged layer. In certain implementations, each stack of anode and cathode materials and/or layers may be coated and/or encapsulated to form an individual segment. Additionally or alternatively, the stacking of the positively charged and/or negatively charged layers may result in and/or lead to gaps forming between the columns of coated electrode segments of the battery. The gaps formed between the coated electrode segments may give, provide, and/or facilitate flexibility for the battery as a whole.

In some examples, the positively charged and/or negatively charged layers may be wrapped, encased, and/or enshrouded in a pouch package. In one example, the pouch package may include and/or represent laminate material that holds the internal core of positively charged and/or negatively charged layers intact and/or together. Additionally or alternatively, the pouch package may be flexible, stretchable, bendable, and/or resilient.

In some examples, double-sided adhesives (e.g., double-sided tapes) may be added between the internal core of positively charged and/or negatively charged layers and the pouch package to prevent wrinkles from forming upon bending and/or flexing the battery. In one example, stiffeners (e.g., FR-4 and/or nickel) may be disposed on and/or applied to the exterior of the pouch package to flatten and/or provide support for the coated segments of the positively charged and/or negatively charged layers. In this example, the stiffeners may mitigate and/or prevent wrinkles from forming upon bending and/or flexing the battery.

The following will provide, with reference to FIGS. 1-8, detailed descriptions of exemplary devices, systems, components, and corresponding implementations for embedding and protecting flexible batteries in wearables. In addition, detailed descriptions of methods for embedding and protecting flexible batteries in wearables will be provided in connection with FIG. 9. The discussion corresponding to FIGS. 10-14 will provide detailed descriptions of types of exemplary artificial-reality devices, wearables, and/or associated systems capable of embedding and protecting flexible batteries in wearables.

FIG. 1 illustrates a portion of an exemplary wearable 100 that includes and/or represents an exoskeleton 102, a flexible battery 104, and/or a band 106. As illustrated in FIG. 1, exemplary flexible battery 104 may include and/or represent coated electrode segments 112(1), 112(2), 112(3), 112(4), 112(5), 112(6), 112(7), 112(8), 112(9), and 112(10) that each contain positively charged and negatively charged layers. In some examples, exoskeleton 102 may be coupled, attached, and/or secured to flexible battery 104 and/or fitted to contour and/or at least partially encapsulate coated electrode segments 112(1)-(10). Additionally or alternatively, band 106 may form, include, and/or provide a cavity 118 shaped to fit and/or house flexible battery 104.

As illustrated in FIG. 1, exoskeleton 102 may include and/or represent armor capsules 108(1), 108(2), 108(3), 108(4), 108(5), 108(6), 108(7), 108(8), 108(9), and 108(10) configured to be coupled to coated electrode segments 112(1)-(10), respectively. In some examples, each of armor capsules 108(1)-(10) may include and/or represent a top cover and/or a bottom cover. In such examples, the top cover may be shaped to contour and/or fit the top portion of the corresponding coated electrode segment, and the bottom cover may be shaped to contour and/or fit the bottom portion of the corresponding coated electrode segment. In one example, each of armor capsules 108(1)-(10) may be installed and/or applied to one of coated electrode segments 112(1)-(10) via an interference fit that forces the positively charged and negatively charged layers together.

In some examples, each of armor capsules 108(1)-(10) may be installed and/or applied to one of coated electrode segments 112(1)-(10) via a tension fit, a compression fit, a press fit, and/or a slip fit. In one example, each of armor capsules 108(1)-(10) may be installed and/or applied to one of coated electrode segments 112(1)-(10) at least in part by an adhesive. In certain implementations, exoskeleton 102 may include and/or represent a single mechanical unit and/or component that at least partially encapsulates each of coated electrode segments 112(1)-(10). Additionally or alternatively, exoskeleton 102 may include and/or represent a collection of individual and/or independent armor capsules installed and/or applied to coated electrode segments 112(1)-(10).

In some examples, exoskeleton 102 may be sized and/or shaped in any suitable way to at least partially cover, encapsulate, and/or protect flexible battery 104. In one example, exoskeleton 102 may include and/or contain a variety of different materials. Examples of such materials include, without limitation, plastics, acrylics, polyesters, nylons, metals, composites, solids, carbon fibers, combinations or variations of one or more of the same, and/or any other suitable materials.

In some examples, band 106 may be sized and/or shaped in any suitable way to at least partially encompass and/or house flexible battery 104 and/or exoskeleton 102. In one example, band 106 may include and/or represent a flexible wristband designed and/or dimensioned to be donned and/or worn on the wrist of a user. In another example, band 106 may include and/or represent a flexible neckband designed and/or dimensioned to be donned and/or worn around the neck of a user. Additionally or alternatively, band 106 may include and/or represent a flexible ankleband dimensioned to be donned and/or worn on the ankle of a user.

In some examples, band 106 may include and/or contain a variety of different materials. Examples of such materials include, without limitation, rubbers, plastics, cottons, polyesters, nylons, elastics, neoprene, metals, woods, composites, carbon fibers, combinations or variations of one or more of the same, and/or any other suitable materials. In one example, band 106 may be defined and/or formed in a variety of shapes and/or sizes with the aim of securing wearable 100 to the user's wrist, arm, neck and/or ankle. In one example, band 106 may include and/or represent one or more segments, links, and/or sections. Additionally or alternatively, band 106 may be adjustable to provide a one-size-fits-most feature.

In some examples, flexible battery 104 may be physically and/or electrically coupled to circuit 114 via coated electrode segment 102(10). In such examples, flexible battery 104 may source and/or provide electric power to circuit 114. In one example, flexible battery 104 and/or exoskeleton 102 may be integrated into and/or hidden in wearable 100. For example, flexible battery 104 may be able to fit inside cavity 118 of band 106 along with exoskeleton 102 as part of wearable 100. In this example, flexible battery 104 and/or exoskeleton 102 may be installed and/or inserted into band 106 via an entry point 120.

In some examples, wearable 100 may include and/or represent any type or form of computing device and/or power-consuming device that is worn as part of an article of clothing, an accessory, and/or an implant. Examples of wearable 100 include, without limitation, power-consuming wristbands, armbands, pendants, bracelets, rings, jewelry, ankle bands, clothing, smartwatches, electronic textiles, shoes, clips, headbands, gloves, variations or combinations of one or more of the same, and/or any other suitable wearable devices.

In some examples, wearable 100 may be communicatively and/or wirelessly coupled to a remote device (not necessarily illustrated in FIG. 1). Examples of such remote devices include, without limitation, computing devices, client devices, laptops, tablets, desktops, servers, smartphones, Personal Digital Assistants (PDAs), multimedia players, embedded systems, wearable devices, gaming consoles, virtual-reality devices, augmented-reality devices, artificial-reality devices, mobile devices, variations or combinations of one or more of the same, and/or any other suitable remote device.

Figure 2:
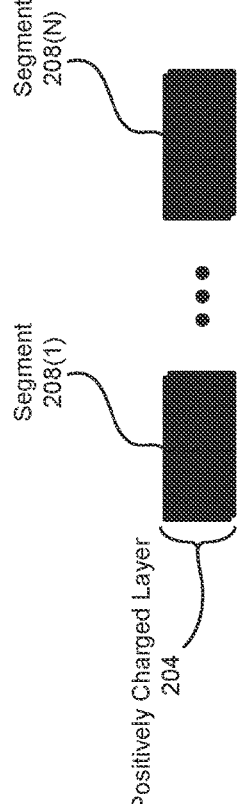
FIG. 2 is an illustration of a portion of an exemplary flexible battery according to one or more embodiments of this disclosure.
Figure 2:
Figure 2:
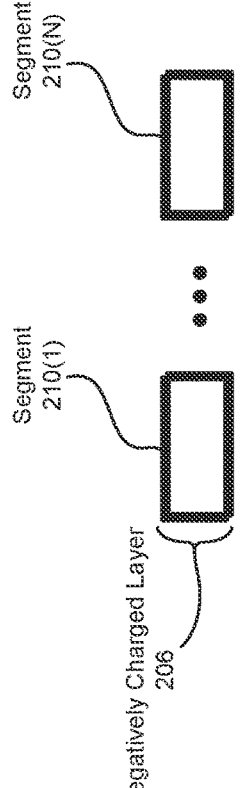

FIG. 2 illustrates a portion of an exemplary flexible battery 104 that includes and/or represents at least one positively charged layer 204 and at least one negatively charged layer 206. In some examples, positively charged layer 204 may include and/or represent segments 208(1)-(N), and/or negatively charged layer 206 may include and/or represent segments 210(1)-(N). In such examples, segments 208(1)-(N) of positively charged layer 204 may include and/or represent pieces of positively charged material, and/or segments 210(1)-(N) of negatively charged layer 206 may include and/or represent pieces of negatively charged material.

In some examples, positively charged layer 204 may include and/or represent a cathode and/or a positive electrode. Additionally or alternatively, negatively charged layer 206 may include and/or represent an anode and/or a negative electrode.

In some examples, flexible battery 104 may include and/or represent any type or form of portable electric power source. In one example, flexible battery 104 may include and/or represent electrochemical cells capable of sourcing and/or providing electric power or current to one or more circuits and/or devices. Examples of flexible battery 104 include, without limitation, lithium-ion batteries, lithium-polymer batteries, primary lithium batteries, alkaline batteries, aluminum-ion batteries, rechargeable batteries, primary cell batteries, secondary cell batteries, flow batteries, metal-air batteries, nickel-cadmium batteries, nickel-metal hydride batteries, combinations or variations of one or more of the same, and/or any other suitable type of battery.

Figure 3:
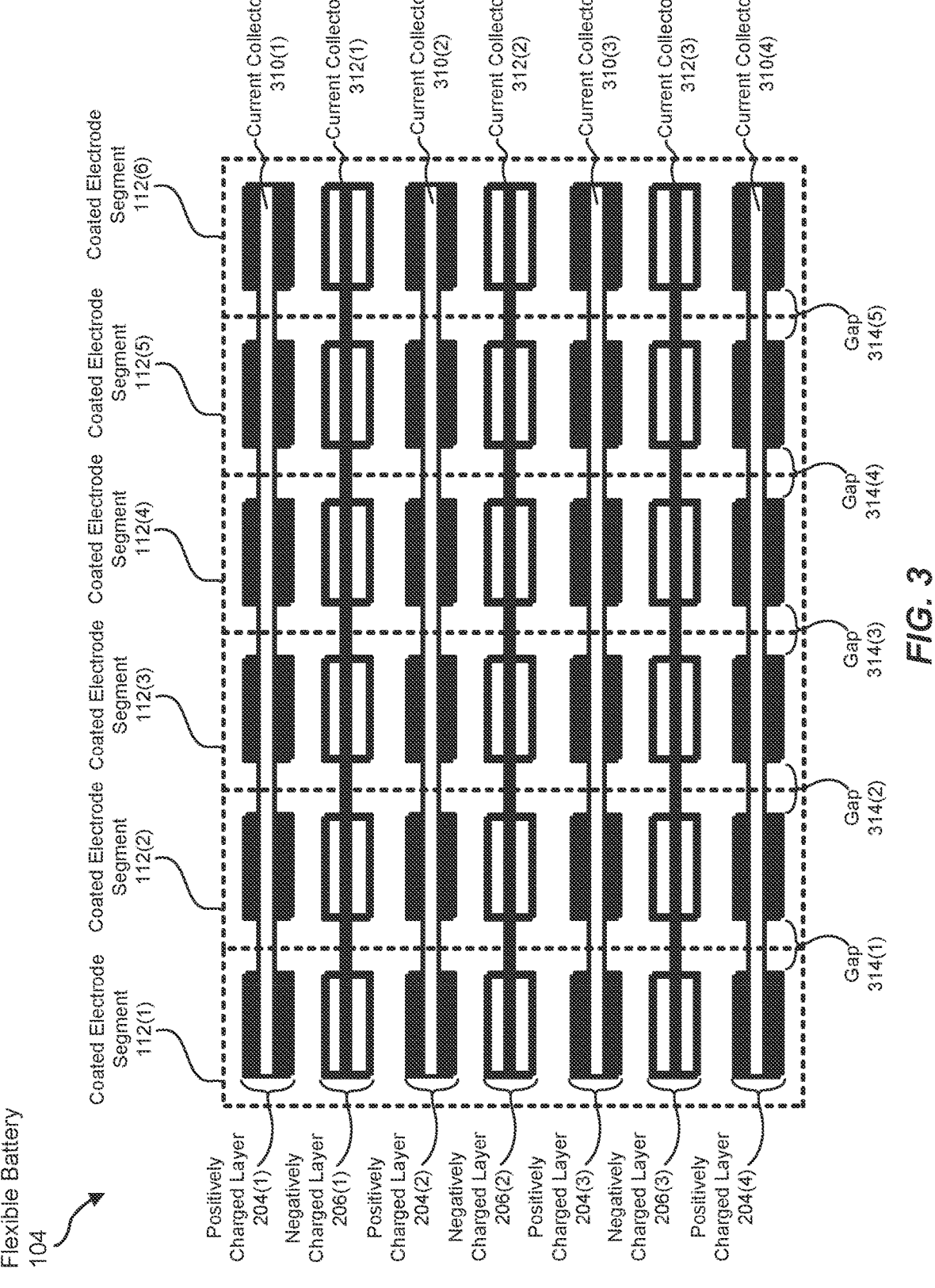
FIG. 3 is an illustration of an exemplary flexible battery according to one or more embodiments of this disclosure.

FIG. 3 illustrates an exemplary implementation of flexible battery 104. As illustrated in FIG. 3, exemplary flexible battery 104 may include and/or represent stacks, pillars, or columns of alternating positively charged and negatively charged segments. In some examples, flexible battery 104 may include and/or represents positively charged layers 204(1), 204(2), 204(3), and 204(4) as well as negatively charged layers 206(1), 206(2), and 206(3). In such examples, each of positively charged layers 204(1)-(4) may include and/or represent multiple segments and/or pieces of cathode material separated by gaps and/or space. Additionally or alternatively, each of negatively charged layers 206(1)-(3) may include and/or represent multiple segments and/or pieces of anode material separated by gaps and/or space.

In some examples, each stack, pillar, and/or column of alternating cathode and anode segments may constitute, represent, and/or form a coated electrode segment. In one example, flexible battery 104 may include and/or represent coated electrode segments 112(1), 112(2), 112(3), 112(4), 112(5), and 112(6). In this example, each of coated electrode segments 112(1)-(6) may include and/or represent a segment and/or piece from all positively charged layers 204(1)-(4) and negatively charged layers 206(1)-(3). The cathode and/or anode segments included in each of coated electrode segments 112(1)-(6) may alternate relative to one another. For example, coated electrode segment 112(1) may include and/or represent a stack arranged in the following order: a segment of positively charged layer 204(1), a segment of negatively charged layer 206(1), a segment of positively charged layer 204(2), a segment of negatively charged layer 206(2), a segment of positively charged layer 204(3), a segment of negatively charged layer 206(3), and/or a segment of positively charged layer 204(4).

In some examples, coated electrode segments 112(1)-(6) may be separated and/or spaced from one another by gaps. For example, coated electrode segments 112(1) and 112(2) may be separated and/or spaced from one another by a gap 314(1), and coated electrode segments 112(2) and 112(3) may be separated and/or spaced from one another by a gap 314(2). In this example, coated electrode segments 112(3) and 112(4) may be separated and/or spaced from one another by a gap 314(3), and coated electrode segments 112(4) and 112(5) may be separated and/or spaced from one another by a gap 314(4). Additionally or alternatively, coated electrode segments 112(5) and 112(6) may be separated and/or spaced from one another by a gap 314(5). Examples of gaps 314(1)-(5) include, without limitation, pockets of air, pockets of gas, filler material, space, combinations or variations of one or more of the same, and/or any other suitable gaps.

In some examples, coated electrode segments 112(1)-(6) may be movably coupled to one another. In one example, gaps 314(1)-(5) may separate, divide, and/or split coated electrode segments 112(1)-(6) from one another. In this example, gaps 314(1)-(5) may enable flexible battery 104 to bend and/or flex across coated electrode segments 112(1)-(6). Additionally or alternatively, gaps 314(1)-(5) may enable flexible battery 104 to bend and/or flex along with band 106 without sustaining damage and/or impairment.

In some examples, coated electrode segments 112(1)-(6) may be electrically coupled and/or connected to one another by current collectors applied across positively charged layers 204(1)-(4) and negatively charged layers 206(1)-(3). For example, positively charged layers 204(1)-(4) may include and/or represent current collectors 310(1), 310(2), 310(3), and 310(4), respectively. In this example, current collectors 310(1)-(4) may be applied and/or electrically coupled across various cathode segments and/or pieces included in positively charged layers 204(1)-(4), respectively. In one example, current collectors 310(1)-(4) may include and/or represent aluminum foil and/or sheeting.

In some examples, negatively charged layers 206(1)-(3) may include and/or represent current collectors 312(1), 312(2), and 312(3), respectively. In such examples, current collectors 312(1)-(3) may be applied and/or electrically coupled across various anode segments and/or pieces included in negatively charged layers 206(1)-(3), respectively. In one example, current collectors 312(1)-(3) may include and/or represent copper foil and/or sheeting.

In some examples, current collectors 310(1)-(4) may be applied and/or electrically coupled across positively charged layers 204(1), 204(2), 204(3), and 204(4), respectively. Additionally or alternatively, current collectors 312(1)-(3) may be applied and/or electrically coupled across negatively charged layers 206(1), 206(2), and 206(3), respectively. Accordingly, current collectors 310(1)-(4) and 312(1)-(3) may span coated electrode segments 112(1)-(6).

Figure 4:
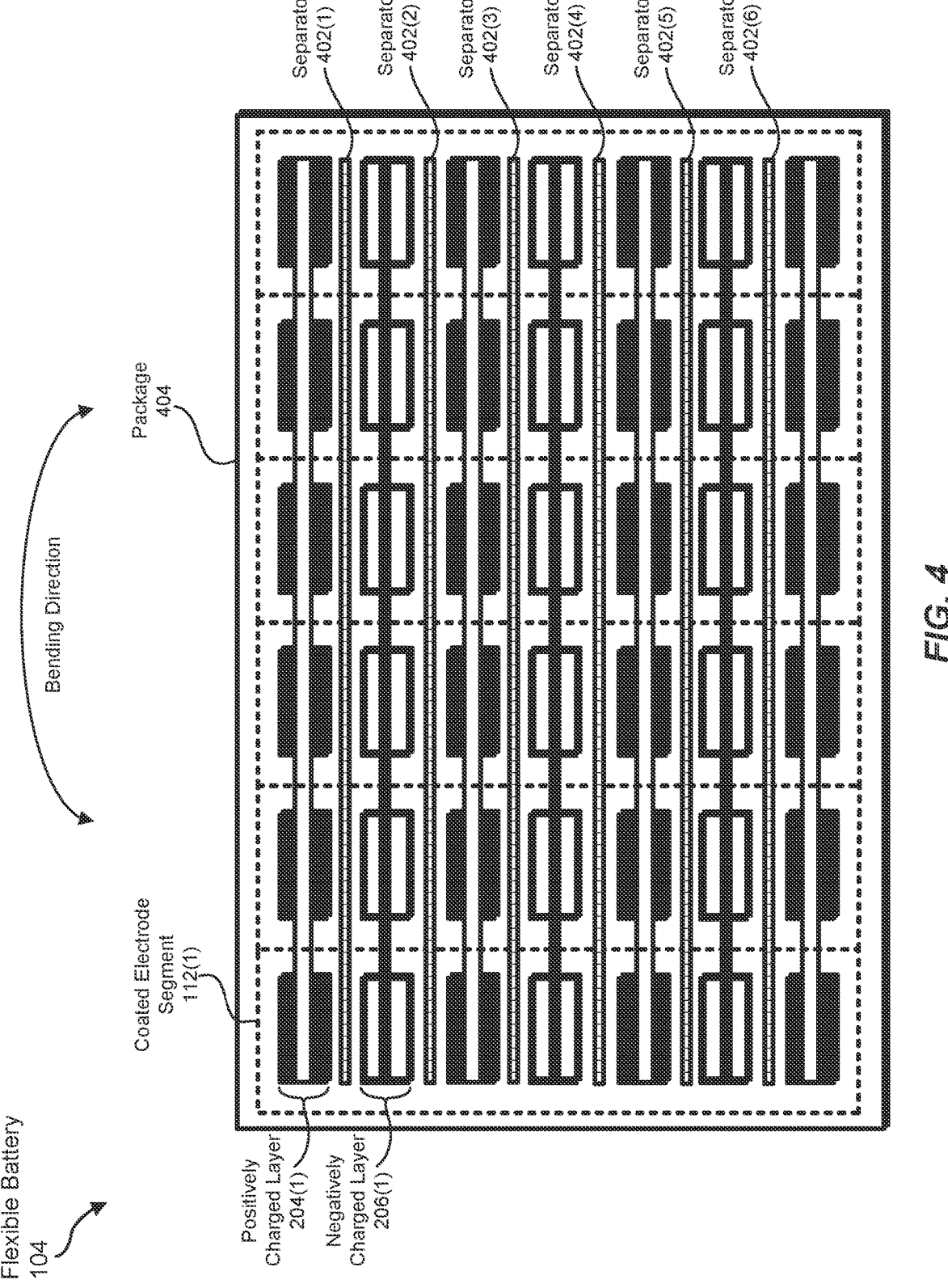
FIG. 4 is an illustration of an exemplary flexible battery according to one or more embodiments of this disclosure.

FIG. 4 illustrates another exemplary implementation of flexible battery 104. As illustrated in FIG. 4, exemplary flexible battery 104 may also include and/or represent a package 404 that encases and/or enshrouds positively charged layers 204(1)-(4) and negatively charged layers 206(1)-(3). In some examples, package 404 may effectively cover and/or coat electrode segments 112(1)-(6) of flexible battery 104. In such examples, package 404 may provide structure and/or support to coated electrode segments 112(1)-(6). Additionally or alternatively, package 404 may compress coated electrode segments 112(1)-(6) to ensure and/or maintain good and/or electrically strong contacts across positively charged layers 204(1)-(4) and negatively charged layers 206(1)-(3).

In one example, package 404 may support and/or provide pressure to the internal core of flexible battery 104 at near-vacuum levels. In this example, the difference between the pressure outside package 404 and the pressure inside package 404 may cause and/or force package 404 to compress and/or firmly hold the internal core of positively charged layers 204(1)-(4) and negatively charged layers 206(1)-(3) together. This compression and/or firm hold on the internal core may promote and/or support good electrical contact across positively charged layers 204(1)-(4) and negatively charged layers 206(1)-(3).

In some examples, exemplary flexible battery 104 may further include and/or represent separators applied and/or positioned between positively charged layers 204(1)-(4) and negatively charged layers 206(1)-(3). For example, a separator 402(1) may be applied and/or positioned between positively charged layer 204(1) and negatively charged layer 206(1), and a separator 402(2) may be applied and/or positioned between negatively charged layer 206(1) and positively charged layer 204(2). In this example, a separator 402(3) may be applied and/or positioned between positively charged layer 204(2) and negatively charged layer 206(2), and a separator 402(4) may be applied and/or positioned between negatively charged layer 206(2) and positively charged layer 204(3). Additionally or alternatively, a separator 402(5) may be applied and/or positioned between positively charged layer 204(3) and negatively charged layer 206(3), and a separator 402(6) may be applied and/or positioned between negatively charged layer 206(3) and positively charged layer 204(4).

In some examples, separators 402(1)-(6) may each electrically insulate the corresponding positively charged and negatively charged layers from one another. In such examples, separators 402(1)-(6) may each include and/or represent an insulation material and/or substance that is a poor conductor of electricity and/or is polarized by an electric field. In one example, separators 402(1)-(6) may each be implemented as solids, liquids, and/or gases. For example, separators 402(1)-(6) may include and/or represent polymer separators. Examples of separators 402(1)-(6) include, without limitation, polyethylene or polypropylene films, polymer, gels, ceramics, porcelains, glasses, plastics, industrial coatings, silicon, germanium, gallium arsenide, mica, metal oxides, silicon dioxides, sapphires, aluminum oxides, dielectrics, variations or combinations of one or more of the same, and/or any other suitable separator materials.

In some examples, the gaps separating coated electrode segments 112(1)-(6) may enable positively charged layers 204(1)-(4) and negatively charged layers 206(1)-(3) to bend and/or flex across coated electrode segments 112(1)-(6) and/or flexible battery 104 as a whole. In one example, such gaps may enable flexible battery 104 to bend and/or flex rotationally and/or radially. For example, if flexible battery 104 were inserted and/or implemented in a wristband of a wearable device, flexible battery 104 may be able to bend and/or flex around the wrist of a user of the wearable device due at least in part to the gaps separating coated electrode segments 112(1)-(6).

Figure 5:
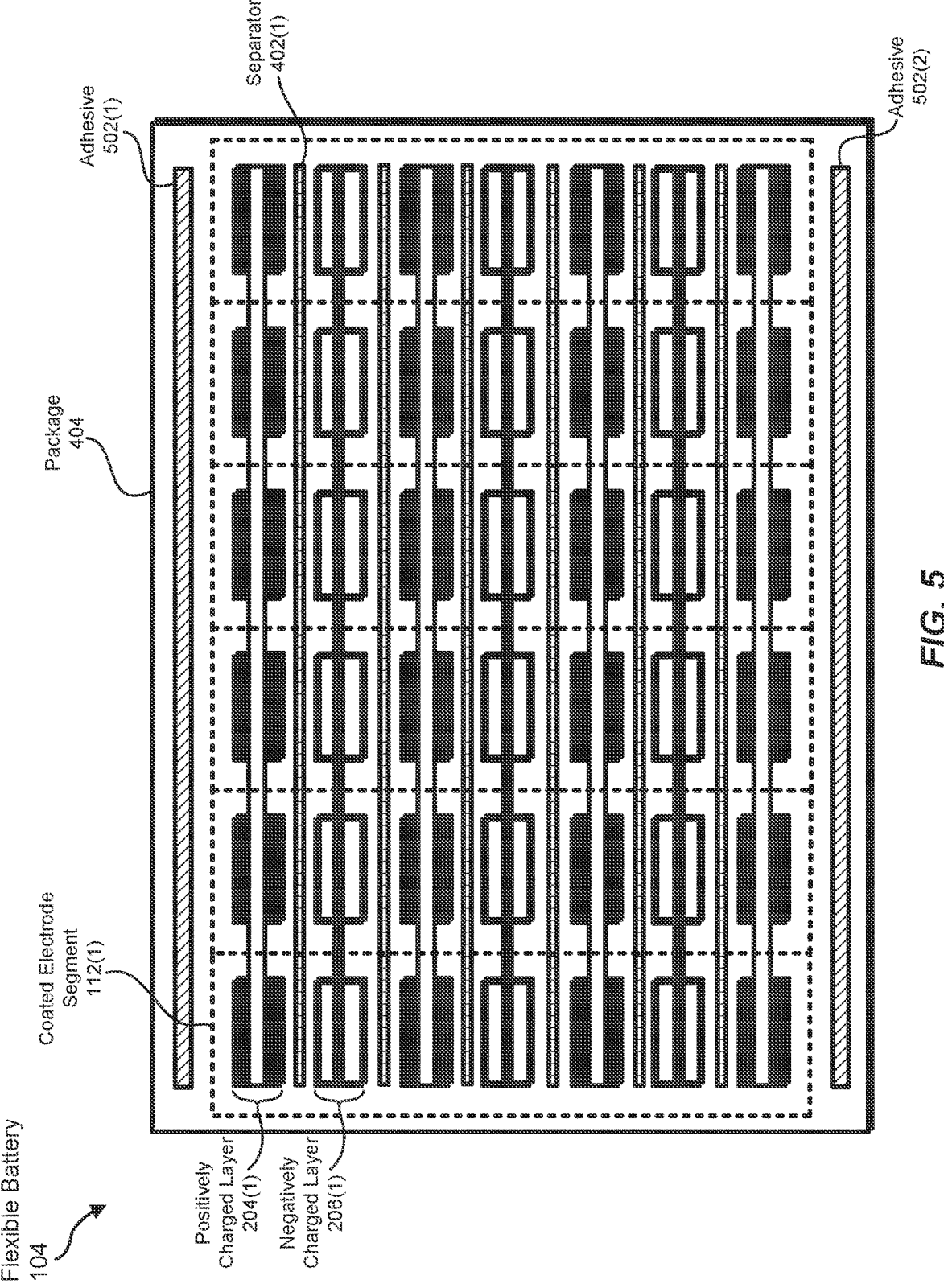
FIG. 5 is an illustration of an exemplary flexible battery according to one or more embodiments of this disclosure.

FIG. 5 illustrates an additional exemplary implementation of flexible battery 104. As illustrated in FIG. 5, exemplary flexible battery 104 may also include and/or represent one or more adhesives that provide additional structural integrity to the internal core. For example, an adhesive 502(1) may be applied, incorporated, and/or coupled between an interior portion of package 404 and positively charged layer 204(1). Additionally or alternatively, an adhesive 502(2) may be applied, incorporated, and/or coupled between another interior portion of package 404 and positively charged layer 204(4). In one example, adhesives 502(1) and 502(2) may keep and/or prevent coated electrode segments 112(1)-(6) from becoming misaligned, askew, and/or crooked.

In one example, adhesives 502(1) and 502(2) may include and/or represent double-sided tape that adheres and/or secures positively charged layers 204(1) and 104(4) to the internal portions of package 404. In another example, adhesives 502(1) and 502(2) may include and/or represent a glue and/or silicone that adheres and/or secures positively charged layers 204(1) and 204(4) to the internal portions of package 404.

Figure 6:
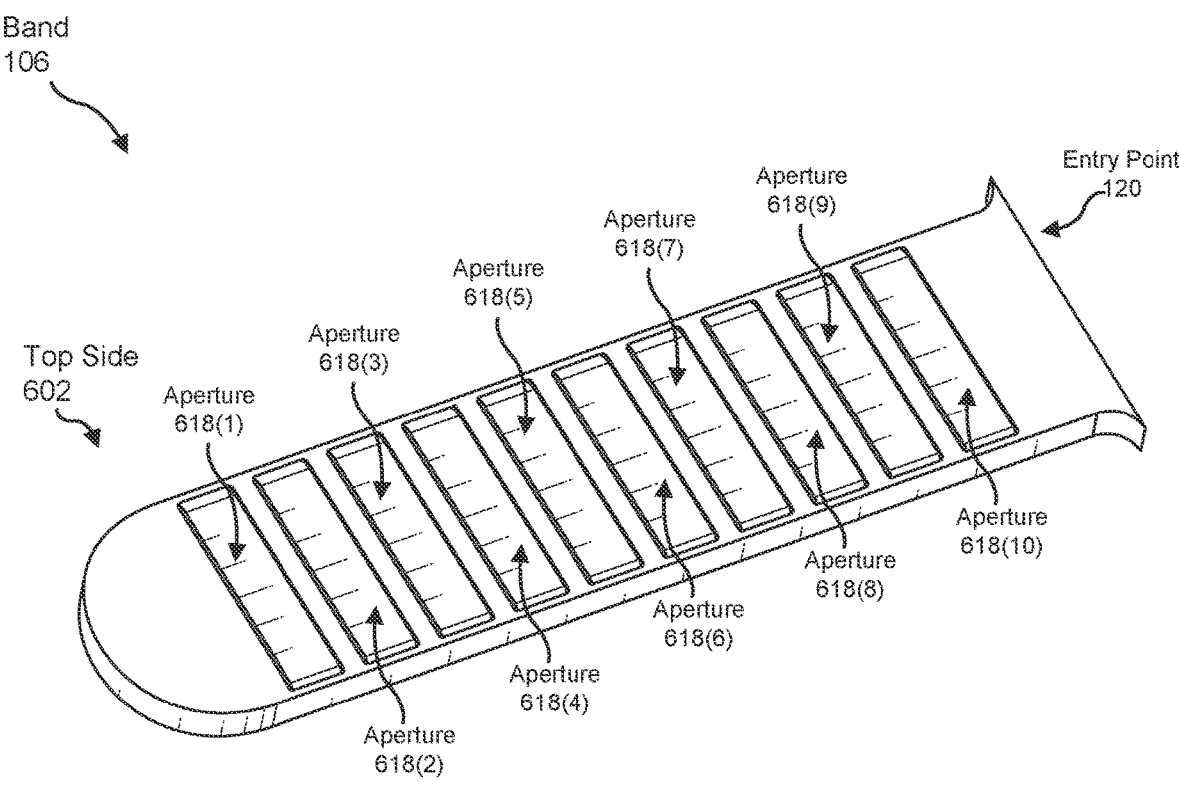
FIG. 6 is an illustration of a top side and a bottom side of an exemplary band incorporated in a wearable according to one or more embodiments of this disclosure.
Figure 6:
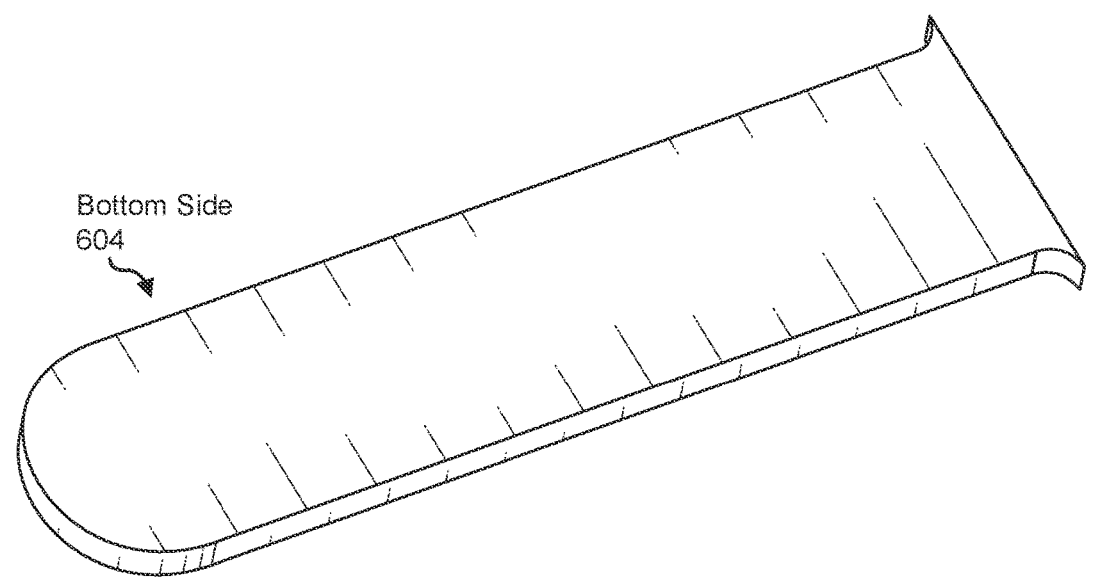

FIG. 6 illustrates an exemplary implementation of band 106. As illustrated in FIG. 6, band 106 may include and/or represent a top side 602 and a bottom side 604. In some examples, top side 602 of band 106 may include, represent, and/or form apertures 618(1), 618(2), 618(3), 618(4), 618(5), 618(6), 618(7), 618(8), 618(9), and 618(10). In such examples, when exoskeleton 102 and flexible battery 104 are installed into band 106, portions of exoskeleton 102 may be partially exposed and/or visible on top side 602. For example, armor capsules 108(1)-(10) of exoskeleton 102 may be partially exposed and/or visible via apertures 618(1)-(10) of band 106, respectively. In one example, bottom side 604 of band 106 may be somewhat complete, solid, and/or sealed such that exoskeleton 102 is not necessarily exposed and/or visible via bottom side 604.

Figure 7:
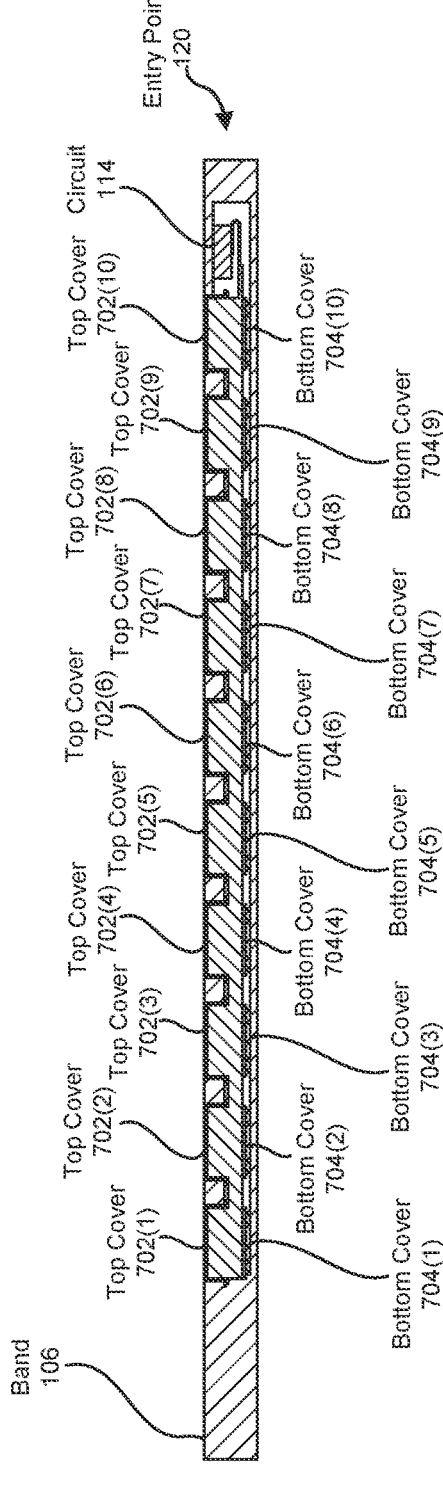
FIG. 7 is an illustration of a portion of an exemplary wearable with an embedded flexible battery that is protected by an exoskeleton according to one or more embodiments of this disclosure.
Figure 7:

FIG. 7 illustrates an exemplary implementation a portion of wearable 100. As illustrated in FIG. 7, wearable 100 may include and/or represent flexible battery 104 and exoskeleton 102 that have been installed and/or inserted at least partially inside cavity 118 of band 106 via entry point 120. In some examples, armor capsules 108(1)-(10) of exoskeleton 102 may include and/or represent top covers 702(1), 702(2), 702(3), 702(4), 702(5), 702(6), 702(7), 702(8), 702(9), and 702(10), respectively. In such examples, armor capsules 108(1)-(10) of exoskeleton 102 may also include and/or represent bottom covers 704(1), 704(2), 704(3), 704(4), 704(5), 704(6), 704(7), 704(8), 704(9), and 704(10), respectively. In one example, armor capsules 108(1)-(10) may be coupled, attached, and/or secured to coated electrode segments 112(1)-(10).

In some examples, armor capsule 108(1) may include and/or represent top cover 702(1) and bottom cover 704(1). In one example, top cover 702(1) may be shaped to contour and/or fit the top portion of coated electrode segment 112(1). In this example, bottom cover 704(1) may be shaped to contour and/or fit the bottom portion of coated electrode segment 112(1).

Additionally or alternatively, armor capsule 108(10) may include and/or represent top cover 702(10) and bottom cover 704(10). In one example, top cover 702(10) may be shaped to contour and/or fit the top portion of coated electrode segment 112(10). In this example, bottom cover 704(10) may be shaped to contour and/or fit the bottom portion of coated electrode segment 112(10).

In one example, band 106 may include and/or represent one side of a wristband of a smartwatch that couples and/or attaches to another side of the wristband. Additionally or alternatively, band 106 may include and/or represent an entire wristband of a smartwatch.

FIG. 8 illustrates an exemplary implementation of a portion of wearable 100. As illustrated in FIG. 8, wearable 100 may include and/or represent flexible battery 104 at least partially encased by exoskeleton 102 inside cavity 118 of band 106. In some examples, armor capsules 108(2) and 108(3) of exoskeleton 102 may include and/or represent top covers 702(2) and 702(3) and bottom covers 704(2) and 704(3), respectively. In such examples, top covers 702(2) and 702(3) may be exposed and/or visible via apertures 618(2) and 618(3) of band 106, respectively. In one example, bottom covers 704(2) and 704(3) may still be covered (e.g., not exposed or visible) by bottom side 604 of band 106.

In some examples, the various devices and/or systems described in connection with FIGS. 1-8 may include and/or represent one or more additional components and/or features that are not necessarily illustrated and/or labeled in FIGS. 1-8. For example, wearable 100 may also include and/or represent analog and/or digital circuitry, onboard logic, transistors, resistors, capacitors, diodes, inductors, switches, registers, flipflops, connections, traces, buses, semiconductor (e.g., silicon) devices and/or structures, processing devices, storage devices, circuit boards, packages, substrates, housings, enclosures, mechanical features, displays, computing devices, combinations or variations of one or more of the same, and/or any other suitable components that facilitate and/or support embedding and protecting flexible batteries in wearables.

Figure 9:
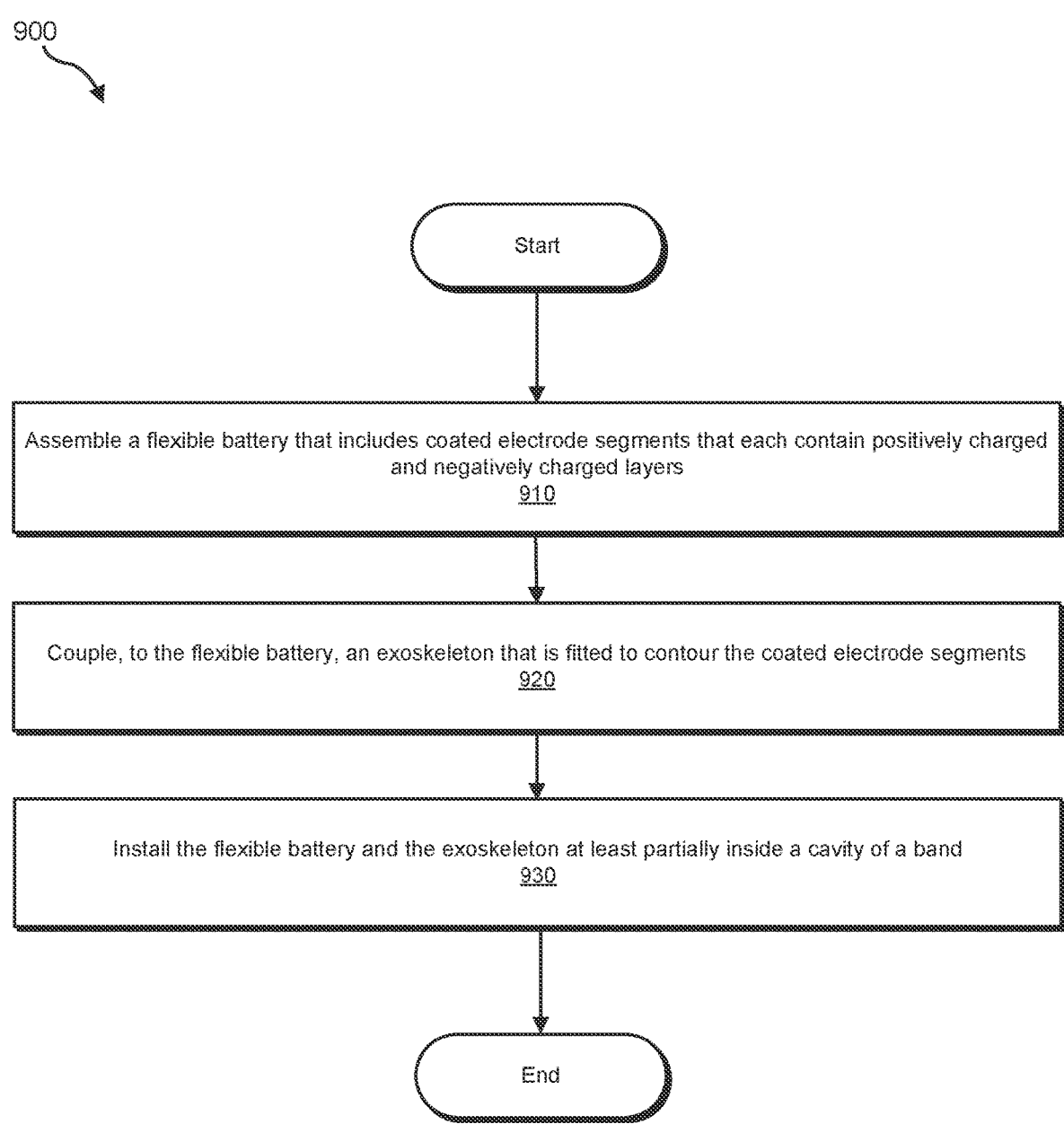
FIG. 9 is a flowchart of an exemplary method for embedding and protecting flexible batteries in wearables according to one or more embodiments of this disclosure.

FIG. 9 is a flow diagram of an exemplary method 900 for embedding and protecting flexible batteries in wearables. In one example, the steps shown in FIG. 9 may be performed during the manufacture and/or assembly of a battery, an exoskeleton, and/or a wearable device. Additionally or alternatively, the steps shown in FIG. 9 may incorporate and/or involve various sub-steps and/or variations consistent with one or more of the descriptions provided above in connection with FIGS. 1-8.

As illustrated in FIG. 9, method 900 may include and/or involve the step of assembling a flexible battery that includes coated electrode segments that each contain positively charged and negatively charged layers (910). Step 910 may be performed in a variety of ways, including any of those described above in connection with FIGS. 1-8. For example, a wearable manufacturer and/or subcontractor may assemble, laminate, and/or construct a flexible battery that includes coated electrode segments that each contain positively charged and negatively charged layers.

In some examples, method 900 may also include and/or involve the step of coupling, to the flexible battery, an exoskeleton that is fitted to contour the coated electrode segments (920). Step 920 may be performed in a variety of ways, including any of those described above in connection with FIGS. 1-8. For example, the wearable manufacturer and/or subcontractor may couple, attach, and/or secure an exoskeleton to the flexible battery. In this example, the exoskeleton may be fitted and/or shaped to contour the coated electrode segments.

In some examples, method 900 may further include and/or involve the step of installing the flexible battery and the exoskeleton at least partially inside a cavity of a band (930). Step 930 may be performed in a variety of ways, including any of those described above in connection with FIGS. 1-8. For example, the battery manufacturer and/or contractor may install and/or insert the flexible battery and the exoskeleton at least partially inside a cavity of a band.

Example Embodiments

Example 1: A wearable comprising (1) a flexible battery that includes coated electrode segments that each contain positively charged and negatively charged layers, (2) an exoskeleton coupled to the flexible battery and fitted to contour the coated electrode segments, and (3) a band that forms a cavity shaped to fit the flexible battery and the exoskeleton.

Example 2: The wearable of Example 1, wherein the flexible battery and the exoskeleton are installed at least partially inside the cavity formed by the band.

Example 3: The wearable of Example 1 or 2, wherein the exoskeleton comprises a plurality of armor capsules coupled to the coated electrode segments.

Example 4: The wearable of any of Examples 1-3, wherein each armor capsule comprises a top cover and a bottom cover, the top cover being shaped to contour a top portion of one of the coated electrode segments and the bottom cover being shaped to contour a bottom portion of the one of the coated electrode segments.

Example 5: The wearable of any of Examples 1-4, wherein each armor capsule is installed to one of the coated electrode segments via an interference fit that forces the positively charged and negatively charged layers together.

Example 6: The wearable of any of Examples 1-5, wherein the exoskeleton comprises a single mechanical unit that at least partially encapsulates each of the coated electrode segments.

Example 7: The wearable of any of Examples 1-6, wherein (1) the coated electrode segments are movably coupled to one another, and (2) the flexible battery comprises a plurality of gaps that separate the coated electrode segments from one another, wherein the gaps enable the flexible battery to bend across the coated electrode segments.

Example 8: The wearable of any of Examples 1-7, wherein the gaps comprise pockets of air or gas and/or filler material.

Example 9: The wearable of any of Examples 1-8, wherein the gaps enable the flexible battery to flex or bend along with the band without sustaining damage.

Example 10: The flexible battery of any of Examples 1-9, wherein the band comprises (1) a flexible wristband that houses the flexible battery and the exoskeleton and/or (2) a flexible necklace that houses the flexible battery and the exoskeleton.

Example 11: The wearable of any of Examples 1-10, wherein the flexible battery further includes a package that encases the positively charged and negatively charged layers and provides structural support to the coated electrode segments.

Example 12: The wearable of any of Examples 1-11, further comprising an adhesive applied between an interior portion of the package and one of the positively charged and negatively charged layers.

Example 13: The wearable of any of Examples 1-12, wherein the coated electrode segments are electrically coupled to one another by (1) a current collector applied across a positively charged layer that includes segments that span the coated electrode segments and (2) an additional current collector applied across a negatively charged layer that includes segments that span the coated electrode segments.

Example 14: A system comprising (1) a wearable device comprising (A) a flexible battery that includes coated electrode segments that each contain positively charged and negatively charged layers, (B) an exoskeleton coupled to the flexible battery and fitted to contour the coated electrode segments, and (C) a band dimensioned to be donned by a user, the band forming a cavity shaped to fit the flexible battery and the exoskeleton and (2) a remote device communicatively coupled to the wearable device.

Example 15: The system of Example 14, wherein the flexible battery and the exoskeleton are installed at least partially inside the cavity formed by the band.

Example 16: The system of Example 14 or 15, wherein the exoskeleton comprises a plurality of armor capsules coupled to the coated electrode segments.

Example 17: The system of any of Examples 14-16, wherein each armor capsule comprises a top cover and a bottom cover, the top cover being shaped to contour a top portion of one of the coated electrode segments and the bottom cover being shaped to contour a bottom portion of the one of the coated electrode segments.

Example 18: The system of any of Examples 14-17, wherein each armor capsule is installed to one of the coated electrode segments via an interference fit that forces the positively charged and negatively charged layers together.

Example 19: The system of any of Examples 14-18, wherein the exoskeleton comprises a single mechanical unit that at least partially encapsulates each of the coated electrode segments.

Example 20: A method comprising (1) assembling a flexible battery that includes coated electrode segments that each contain positively charged and negatively charged layers, (2) coupling, to the flexible battery, an exoskeleton that is fitted to contour the coated electrode segments, and (3) installing the flexible battery and the exoskeleton at least partially inside a cavity of a band.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
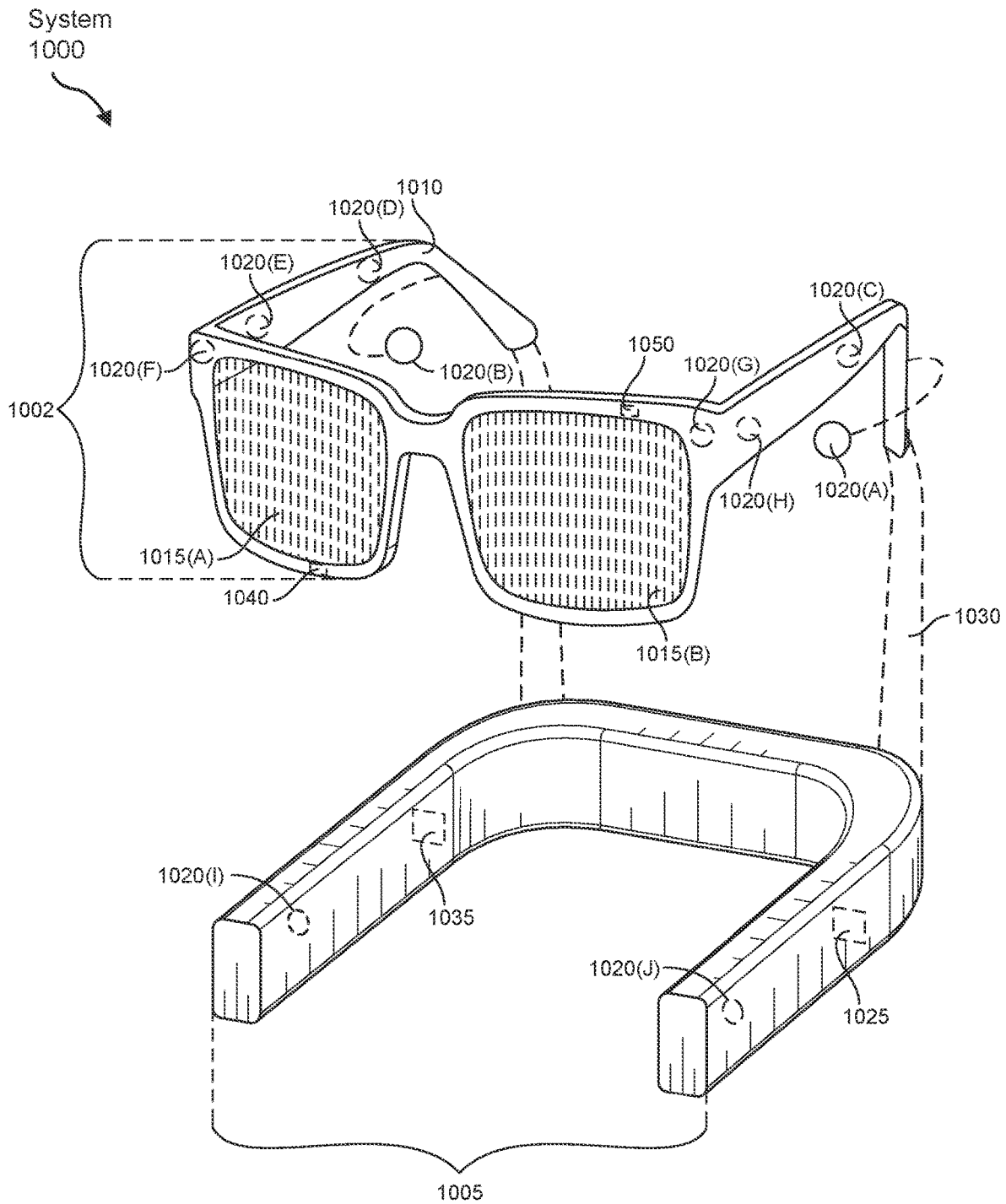
FIG. 10 is an illustration of exemplary augmented-reality glasses that may be used in connection with embodiments of this disclosure.

Turning to FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

In some examples, augmented-reality system 1000 may also include a microphone array with a plurality of acoustic transducers 1020(A)-1020(J), referred to collectively as acoustic transducers 1020. Acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(1) and 1020(J), which may be positioned on a corresponding neckband 1005.

In some embodiments, one or more of acoustic transducers 1020(A)-(J) may be used as output transducers (e.g., speakers). For example, acoustic transducers 1020(A) and/ or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments acoustic transducers 1020(A) and 1020(B) may be connected to augmented-reality system 1000 via a wireless connection (e.g., a BLUETOOTH connection). In still other embodiments, acoustic transducers 1020(A) and 1020(B) may not be used at all in conjunction with augmented-reality system 1000.

Acoustic transducers 1020 on frame 1010 may be positioned in a variety of different ways, including along the length of the temples, across the bridge, above or below display devices 1015(A) and 1015(B), or some combination thereof. Acoustic transducers 1020 may also be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers, other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium-ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1000 and/or virtual-reality system 1100 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1000 and 1100 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 12:
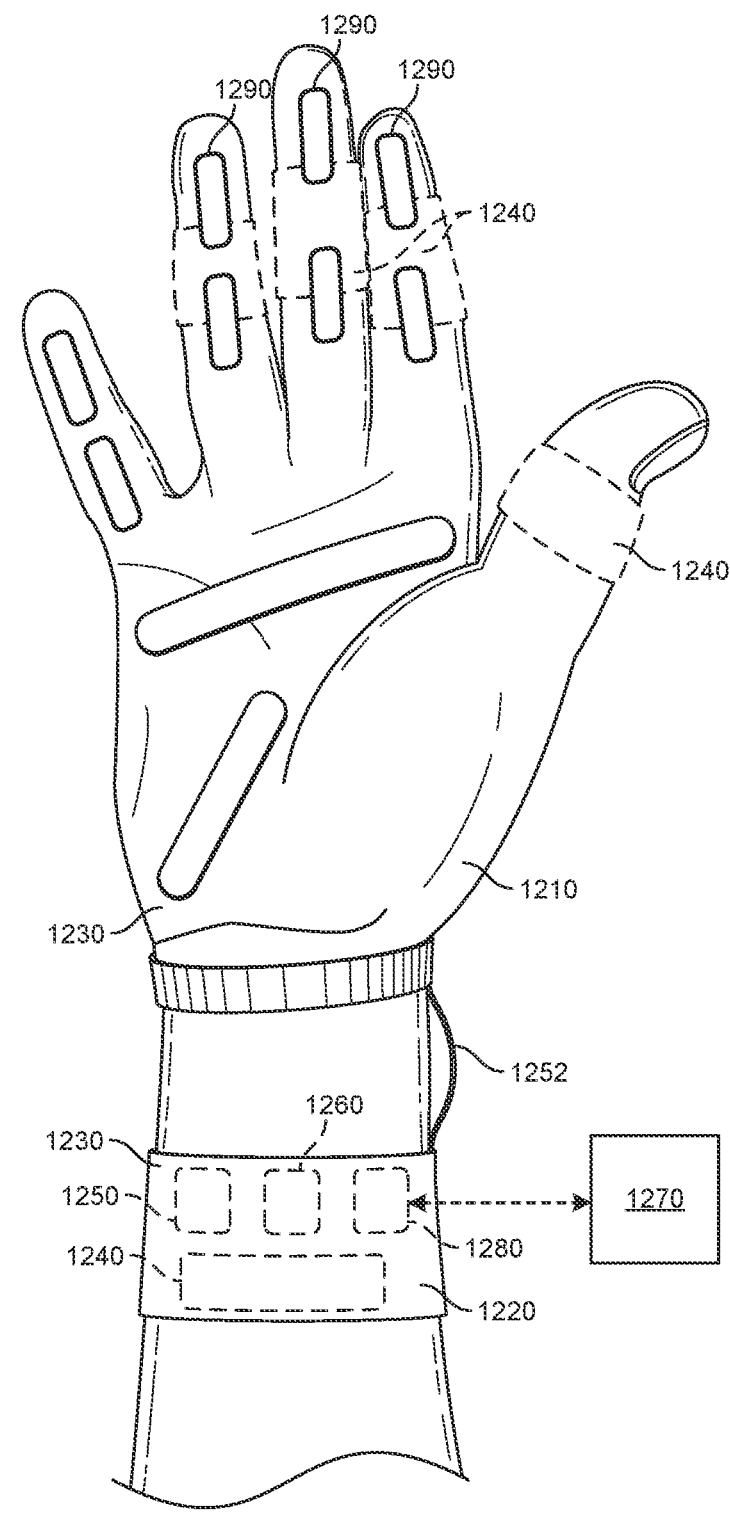
FIG. 12 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 12 illustrates a vibrotactile system 1200 in the form of a wearable glove (haptic device 1210) and wristband (haptic device 1220). Haptic device 1210 and haptic device 1220 are shown as examples of wearable devices that include a flexible, wearable textile material 1230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1240 may be positioned at least partially within one or more corresponding pockets formed in textile material 1230 of vibrotactile system 1200. Vibrotactile devices 1240 may be positioned in locations to provide a vibrating sensation (e.g., haptic feedback) to a user of vibrotactile system 1200. For example, vibrotactile devices 1240 may be positioned against the user's finger(s), thumb, or wrist, as shown in FIG. 12. Vibrotactile devices 1240 may, in some examples, be sufficiently flexible to conform to or bend with the user's corresponding body part(s).

A power source 1250 (e.g., a battery) for applying a voltage to the vibrotactile devices 1240 for activation thereof may be electrically coupled to vibrotactile devices 1240, such as via conductive wiring 1252. In some examples, each of vibrotactile devices 1240 may be independently electrically coupled to power source 1250 for individual activation. In some embodiments, a processor 1260 may be operatively coupled to power source 1250 and configured (e.g., programmed) to control activation of vibrotactile devices 1240.

Vibrotactile system 1200 may be implemented in a variety of ways. In some examples, vibrotactile system 1200 may be a standalone system with integral subsystems and components for operation independent of other devices and systems. As another example, vibrotactile system 1200 may be configured for interaction with another device or system 1270. For example, vibrotactile system 1200 may, in some examples, include a communications interface 1280 for receiving and/or sending signals to the other device or system 1270. The other device or system 1270 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1280 may enable communications between vibrotactile system 1200 and the other device or system 1270 via a wireless (e.g., Wi-Fi, BLUETOOTH, cellular, radio, etc.) link or a wired link. If present, communications interface 1280 may be in communication with processor 1260, such as to provide a signal to processor 1260 to activate or deactivate one or more of the vibrotactile devices 1240.

Vibrotactile system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, vibrotactile devices 1240 may be configured to be activated for a variety of different reasons, such as in response to the user's interaction with user interface elements, a signal from the motion or position sensors, a signal from the touch-sensitive pads 1290, a signal from the pressure sensors, a signal from the other device or system 1270, etc.

Although power source 1250, processor 1260, and communications interface 1280 are illustrated in FIG. 12 as being positioned in haptic device 1220, the present disclosure is not so limited. For example, one or more of power source 1250, processor 1260, or communications interface 1280 may be positioned within haptic device 1210 or within another wearable textile.

Figure 13:
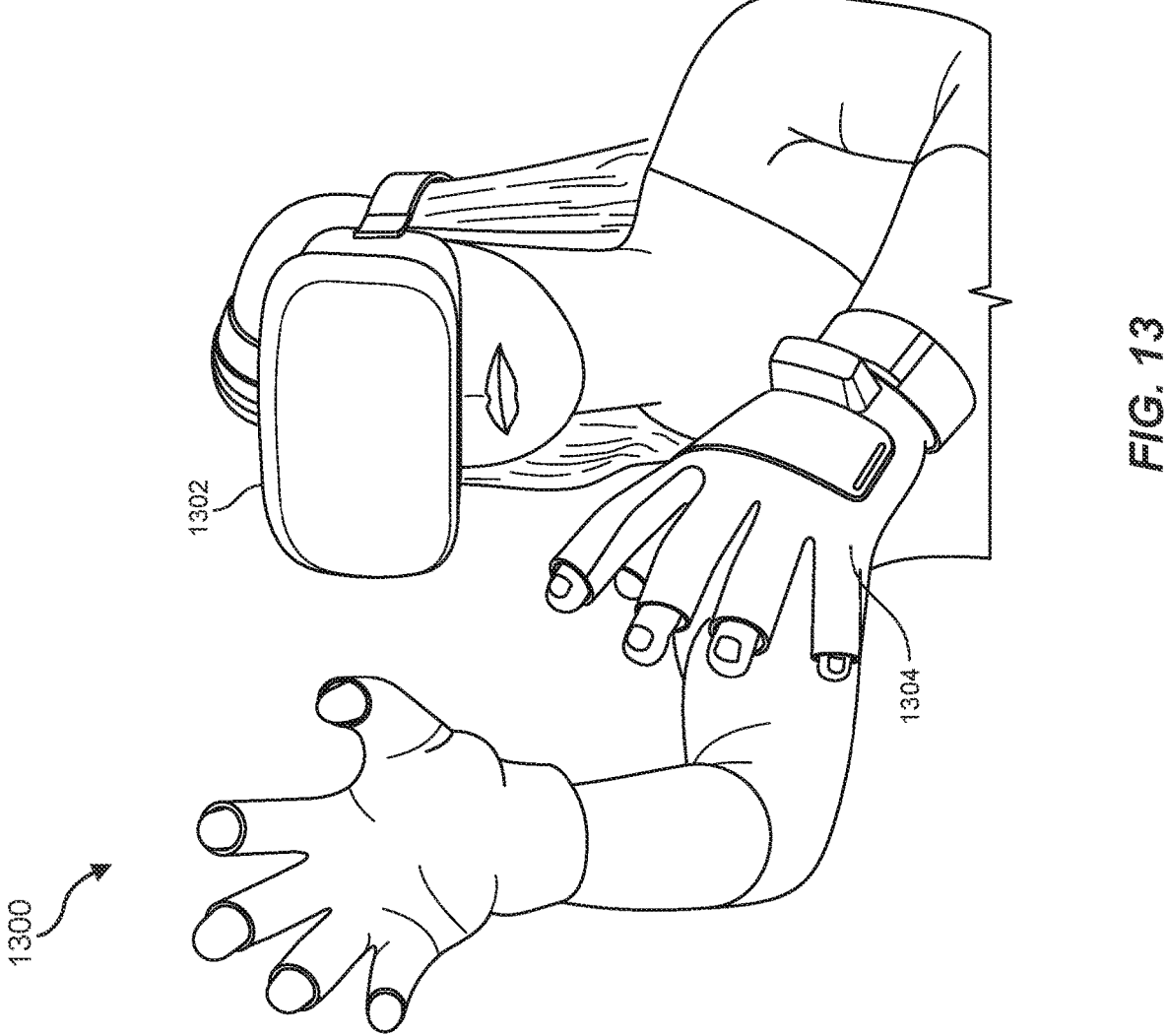
FIG. 13 is an illustration of an exemplary virtual-reality environment according to embodiments of this disclosure.

Haptic wearables, such as those shown in and described in connection with FIG. 12, may be implemented in a variety of types of artificial-reality systems and environments. FIG. 13 shows an example artificial-reality environment 1300 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 11:
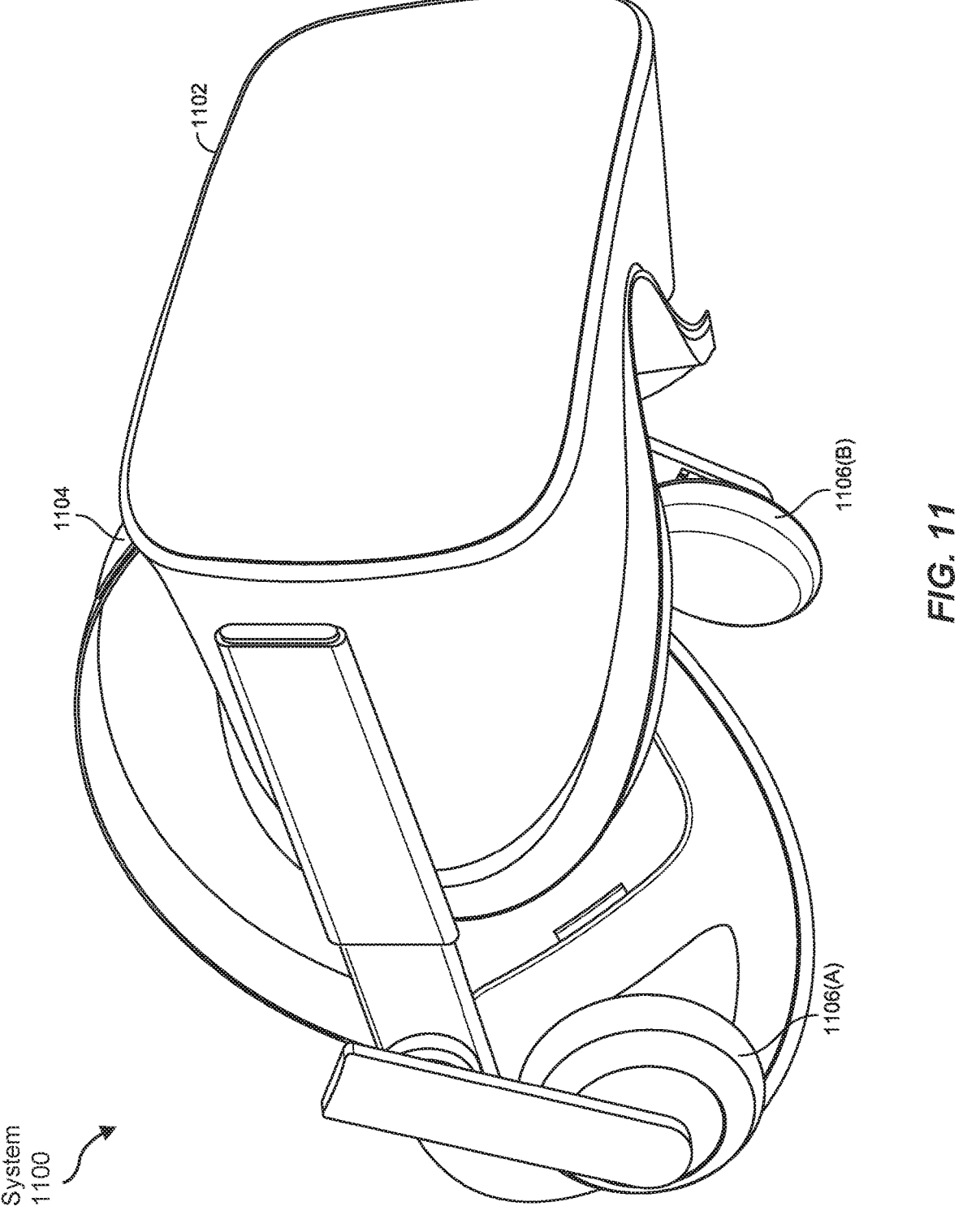
FIG. 11 is an illustration of an exemplary virtual-reality headset that may be used in connection with embodiments of this disclosure.

Head-mounted display 1302 generally represents any type or form of virtual-reality system, such as virtual-reality system 1100 in FIG. 11. Haptic device 1304 generally represents any type or form of wearable device, worn by a user of an artificial-reality system, that provides haptic feedback to the user to give the user the perception that he or she is physically engaging with a virtual object. In some embodiments, haptic device 1304 may provide haptic feedback by applying vibration, motion, and/or force to the user. For example, haptic device 1304 may limit or augment a user's movement. To give a specific example, haptic device 1304 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1304 to send action requests to a console. Examples of action requests include, without limitation, requests to start an application and/or end the application and/or requests to perform a particular action within the application.

Figure 14:
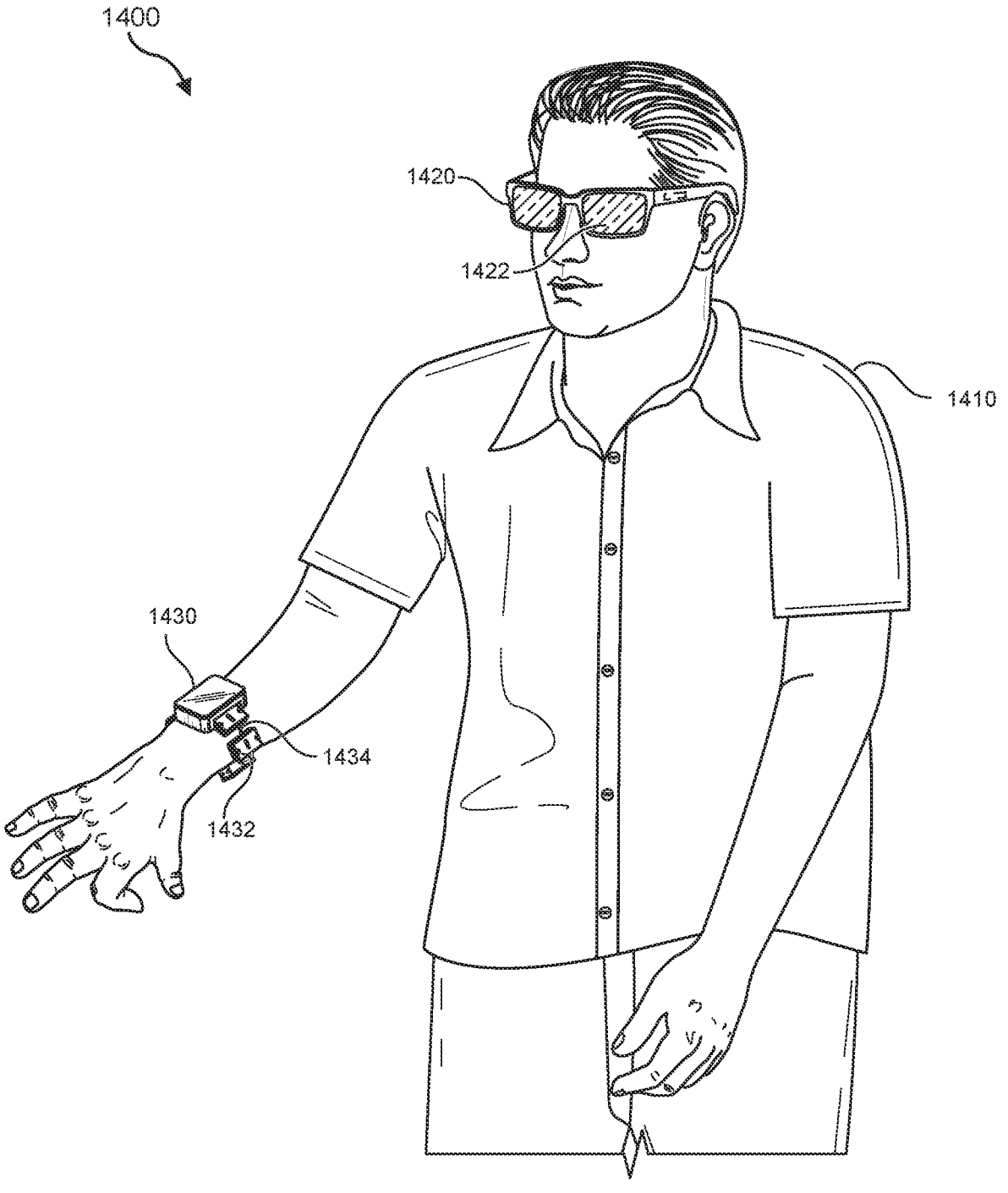
FIG. 14 is an illustration of an exemplary augmented-reality environment according to embodiments of this disclosure.

While haptic interfaces may be used with virtual-reality systems, as shown in FIG. 13, haptic interfaces may also be used with augmented-reality systems, as shown in FIG. 14. FIG. 14 is a perspective view of a user 1410 interacting with an augmented-reality system 1400. In this example, user 1410 may wear a pair of augmented-reality glasses 1420 that may have one or more displays 1422 and that are paired with a haptic device 1430. In this example, haptic device 1430 may be a wristband that includes a plurality of band elements 1432 and a tensioning mechanism 1434 that connects band elements 1432 to one another.

One or more of band elements 1432 may include any type or form of actuator suitable for providing haptic feedback. For example, one or more of band elements 1432 may be configured to provide one or more of various types of cutaneous feedback, including vibration, force, traction, texture, and/or temperature. To provide such feedback, band elements 1432 may include one or more of various types of actuators. In one example, each of band elements 1432 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1210, 1220, 1304, and 1430 may include any suitable number and/or type of haptic transducer, sensor, and/or feedback mechanism. For example, haptic devices 1210, 1220, 1304, and 1430 may include one or more mechanical transducers, piezoelectric transducers, and/or fluidic transducers. Haptic devices 1210, 1220, 1304, and 1430 may also include various combinations of different types and forms of transducers that work together or independently to enhance a user's artificial-reality experience. In one example, each of band elements 1432 of haptic device 1430 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A wearable comprising:
a flexible battery comprising:
    a plurality of coated electrode segments, wherein each coated electrode segment includes a positively charged layer and a negatively charged layer; and
    at least one current collector, wherein each of the plurality of coated electrode segments is electrically coupled to the at least one current collector, permitting each of the plurality of coated electrode segments to be movably coupled to each other;
an exoskeleton coupled to the flexible battery and at least partially encapsulating each of the plurality of coated electrode segments; and
a band including a cavity shaped to receive the plurality of coated electrode segments and the at least one current collector of the flexible battery and the exoskeleton.

2. The wearable of claim 1, wherein the flexible battery and the exoskeleton are installed at least partially inside the cavity of the band.

3. The wearable of claim 1, wherein the exoskeleton comprises a plurality of armor capsules, wherein each armor capsule is coupled to a respective coated electrode segment of the plurality of coated electrode segments of the flexible battery.

4. The wearable of claim 3, wherein each armor capsule comprises a top cover and a bottom cover coupled to a respective coated electrode segment of the plurality of coated electrode segments of the flexible battery.

5. The wearable of claim 3, wherein each armor capsule is coupled to a respective coated electrode segment of the plurality of coated electrode segments of the flexible battery via an interference fit that forces the positively charged layer and the negatively charged layer of the respective coated electrode segment together.

6. The wearable of claim 1, wherein the exoskeleton comprises a single mechanical unit that at least partially encapsulates each of the plurality of coated electrode segments.

7. The wearable of claim 1, wherein:

the flexible battery comprises a plurality of gaps that separate the coated electrode segments from one another, wherein the gaps enable the flexible battery to bend across the coated electrode segments.

8. The wearable of claim 7, wherein the gaps comprise at least one of:

pockets of air or gas; or filler material.

9. The wearable of claim 1, wherein the band comprises at least one of:

a flexible wristband that houses the flexible battery and the exoskeleton; and a flexible necklace that houses the flexible battery and the exoskeleton.

10. The wearable of claim 1, wherein the flexible battery further includes a package that encases the positively charged and negatively charged layers and provides structural support to the coated electrode segments.

11. The wearable of claim 10, further comprising an adhesive applied between an interior portion of the package and one of the positively charged and negatively charged layers.

12. The wearable of claim 1, wherein the at least one current collector is electrically coupled to a plurality of respective positively charged layers of the plurality of coated electrode segments.

13. A system comprising:

a wearable device comprising:

a flexible battery comprising:

a plurality of coated electrode segments, wherein each coated electrode segment includes a positively charged layer and a negatively charged layer; and at least one current collector, wherein each of the plurality of coated electrode segments is electrically coupled to the at least one current collector, permitting each of the plurality of coated electrode segments to be movably coupled to each other;

an exoskeleton coupled to the flexible battery and at least partially encapsulating each of the plurality of coated electrode segments; and a band dimensioned to be donned by a user, the band including a cavity shaped to receive the plurality of coated electrode segments and the at least one current collector of the flexible battery and the exoskeleton; and a remote device communicatively coupled to the wearable device.

14. The system of claim 13, wherein the flexible battery and the exoskeleton are installed at least partially inside the cavity of the band.

15. The system of claim 13, wherein the exoskeleton comprises a plurality of armor capsules, wherein each armor capsule is coupled to a respective coated electrode segment of the plurality of coated electrode segments of the flexible battery.

16. The system of claim 15, wherein each armor capsule comprises a top cover and a bottom cover coupled to a respective coated electrode segment of the plurality of coated electrode segments of the flexible battery.

17. The system of claim 15, wherein each armor capsule is coupled to a respective coated electrode segment of the plurality of coated electrode segments of the flexible battery via an interference fit that forces the positively charged layer and the negatively charged layer of the respective coated electrode segment together.

18. The system of claim 13, wherein the exoskeleton comprises a single mechanical unit that at least partially encapsulates each of the plurality of coated electrode segments.

19. A method comprising:

assembling a flexible battery, the flexible battery comprising:

a plurality of coated electrode segments, wherein each coated electrode segment includes a positively charged layer and a negatively charged layer; and at least one current collector, wherein each of the plurality of coated electrode segments is electrically coupled to the at least one current collector, permitting each of the plurality of coated electrode segments to be movably coupled to each other;

coupling, to the flexible battery, an exoskeleton that is at least partially encapsulating each of the plurality of the coated electrode segments; and installing the plurality of coated electrode segments and the at least one current collector of the flexible battery and the exoskeleton at least partially inside a cavity of a band.

20. The wearable of claim 3, wherein the band includes a plurality of cavities, wherein each cavity is shaped to receive a respective coated electrode segment of the plurality of coated electrode segments of the flexible battery and a respective armor capsule of the plurality of armor capsules.

* * * * *